Dec. 9, 1924.
M. E. ROE
1,518,411
SHEET METAL WHEEL
Filed Sept. 27, 1923   2 Sheets-Sheet 1
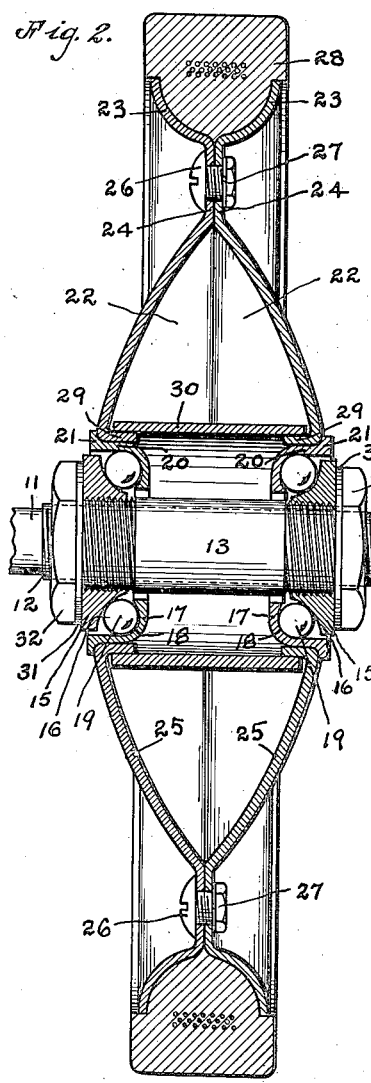
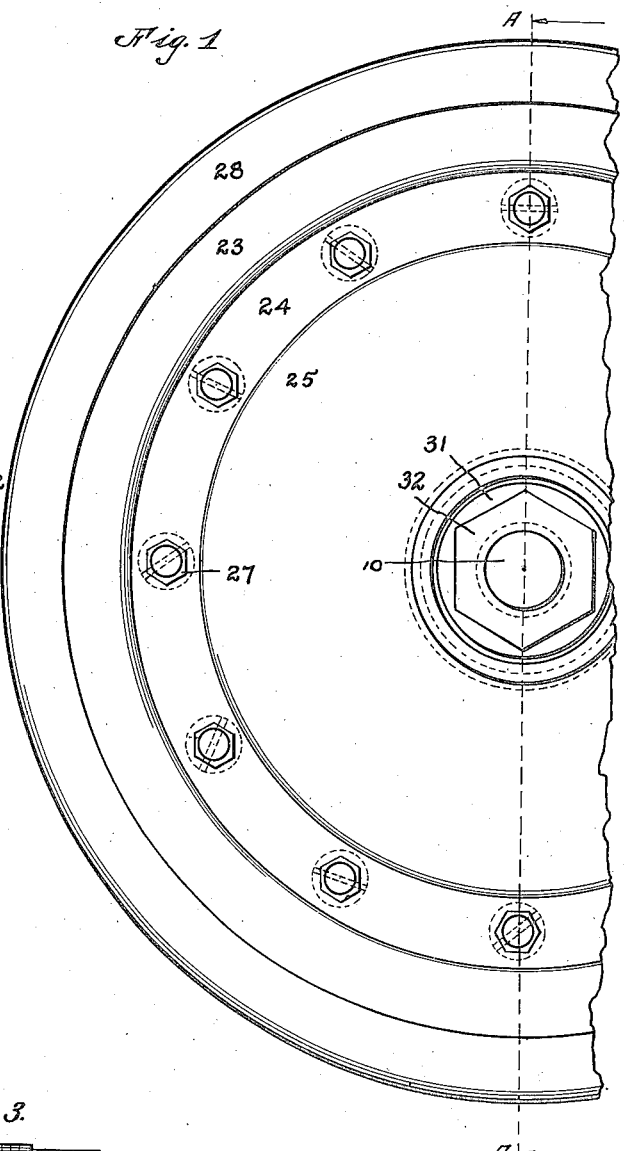
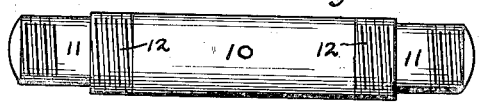
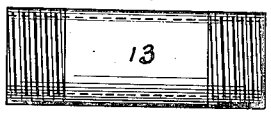
INVENTOR.
Mayo E. Roe
BY
Richey, Slough & Watts
ATTORNEYS

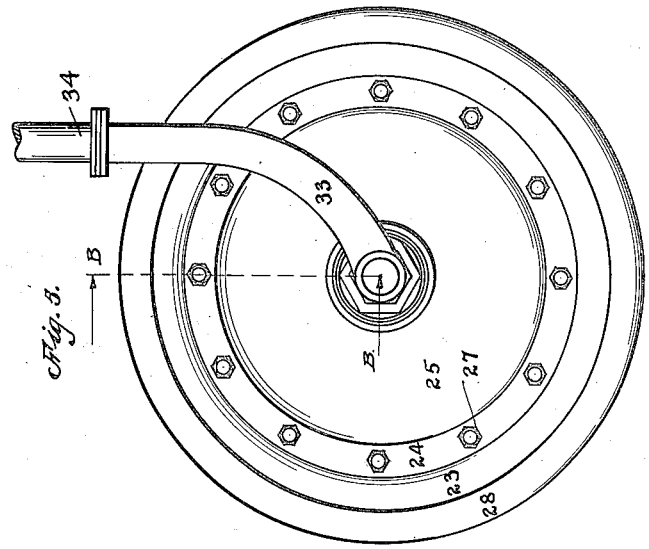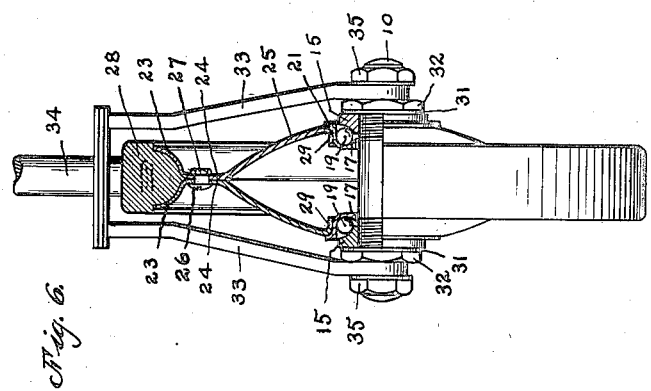

Patented Dec. 9, 1924.

1,518,411

UNITED STATES PATENT OFFICE.

MAYO E. ROE, OF ELYRIA, OHIO, ASSIGNOR TO THE COLSON COMPANY, OF ELYRIA, OHIO, A CORPORATION OF OHIO.

SHEET-METAL WHEEL.

Application filed September 27, 1923. Serial No. 665,219.

*To all whom it may concern:*

Be it known that I, MAYO E. ROE, a citizen of the United States, residing at Elyria, in the county of Lorain and State of Ohio, have invented certain new and useful Improvements in Sheet-Metal Wheels, of which the following is a specification.

This invention relates to wheels for vehicles and more particularly to disc wheels which are rotatably mounted upon a supporting shaft.

An object of my invention resides in constructing a wheel from two sheet metal discs which are formed and secured together to provide an outwardly extending tire seat, a vertical intermediate portion, and convexly curved inner portions providing a hub.

Another object of my invention is to construct a wheel from two sheet metal discs, the inner portions of which are spaced apart and terminate in inturned hub flanges, which are longitudinally adjustable upon and secured to a shaft, in desired spaced relation.

Another object of my invention is to provide a wheel which comprises two discs having spaced inner portions providing with inturned hub flanges, an annular hollow hub member intermediate the spaced inner disc portions which loosely surrounds the hub flanges, and means for adjustably securing the inner disc portions longitudinally upon a supporting shaft.

Other objects of my invention and the invention itself will be more apparent by reference to the drawings which form a part of this specification, and in which drawings, Fig. 1 is a partial side elevation of my improved wheel;

Fig. 2 is a section taken on line A—A of Fig. 1;

Fig. 3 is a side elevation of the solid wheel shaft removed from the assembly;

Fig. 4 is a side elevation of the hollow wheel shaft removed from the assembly;

Fig. 5 is a side elevation of a modified type of wheel; and

Fig. 6 is a section of the same taken on line B—B of Fig. 5.

Referring now to the drawings, in all of which like parts are designated by like reference characters, at 10 I show a solid axle or shaft having slightly reduced threaded ends 11, the axle also being threaded at 12 adjacent each of the reduced ends. A hollow axle 13 is loosely mounted upon the solid shaft 10, and is provided with threads 14 at each end thereof. This axle is of shorter length than the shaft upon which it is mounted. Internally threaded bearing cones 15 are screwed upon the threaded ends of the axle 13, and the inner faces thereof are curved to provide circular runways 16. Annular bearing ring members 17 are provided with a curved runway 18, and ball bearings 19 are positioned between the runways 16 and 18 of the pairs of bearing members. The rings 18 have transverse annular walls 20 which extend around a portion of the cone members 15 and terminate in upstanding flanges 21.

A pair of similarly formed sheet metal discs 22 are secured together to provide the body of the wheel. These discs are each formed from a centrally apertured piece of metal which is bent to provide an outwardly curved peripheral rim portion 23, an intermediate vertical portion 24, and a convexly curved inner portion 25. The vertical portions are of relatively short length and are provided with spaced aligned apertures through which bolts 26 extend, and nuts 27 are secured thereon to removably maintain the discs tightly together. When so secured together the peripheral flanges provide a seat within which a rubber tire 28 is secured. The inner edges of the curved inner portion of the discs curve outwardly and are turned in to provide annular hub flanges 29. As shown in Figs. 1 and 2, I provide a hollow cylindrical hub member 30 intermediate the inner walls of the curved inner portions of the disc members, which is loosely mounted upon and surrounds the hub flanges 29. This hub member serves as a spacer, and central supporting element, adding rigidity and strength to the wheel. This element, however, is not essential where the character of the vehicle permits a lighter construction, and as shown in Figs. 5 and 6, I illustrate a wheel which does not include this element.

The inner surface of the annular hub flanges 29 are of slightly greater diameter than the diameter of the transverse wall 20 of the bearing ring and is carried thereon and maintained in position by the upstanding flanges 21 which engage the outer face of the curved inner portions of the discs. By screwing the cone bearing 15 longitudinally upon the shaft 13, the space between the curved inner portions of the disc can be adjusted to the desired relation with each other, and in position relative to the shaft as desired. This adjustment is accomplished by the movement of the ball bearings and the rings 21 upon which the curved portions of the discs are mounted.

Washers 31 are placed, adjacent the outer ends of the cone bearings, upon the shaft 10, and nuts 32 are screwed thereagainst to maintain the cones in position. The shaft 10 is carried by arms 33 of a fork which is carried by a spindle 34 and nuts 35 are secured upon the threaded reduced end of the axle 10 to secure the fork arms thereon. The construction of the fork and spindle is a conventional form of castor wheel mounting, and various other methods of mounting the axle could be used equally as well.

It will thus be seen that I provide a pair of discs which curve outwardly, the free ends of which are compressed toward each other by bearing rings which are free to rotate with the wheel, and that the bearing members are adjustable upon the shaft to regulate the space between the inner disc sections, and to regulate the position of the discs longitudinally upon the axle. The construction of the discs and hub member is such that a strong durable wheel is provided, which can be used on hand trucks, and like vehicles to support various loads.

Having thus described my invention, it will be understood that numerous and extensive departures may be made from the details of construction in the embodiments herein illustrated and described, without departing from the spirit of my invention.

I claim:—

1. A wheel of the class described, comprising a pair of similar sheet metal discs, each of said discs being formed with an outwardly flanged periphery providing a tire seat, vertical intermediate portions, and convexly curved inner portions terminating in inturned annular hub flanges; means securing the vertical portions of said discs together; and a spacer sleeve extending intermediate the convexly curved portions of said discs and loosely around said inturned hub flanges.

2. A wheel of the class described, comprising a pair of centrally apertured sheet metal discs, said discs each being formed of a single piece of metal having outwardly extending peripheral portions forming a tire seat, vertical intermediate portions adapted to be secured together, and convexly curved inner portions terminating in inturned annular hub flanges; and a hollow cylindrical hub member extending around the said inturned hub flanges between the convexly curved inner portions of said discs.

3. A wheel of the class described, comprising a pair of similar sheet metal discs, each of said discs being formed with an outwardly flanged periphery providing a tire seat, vertical intermediate portions secured together, and convexly curved inner portions terminating in inturned annular hub flanges; and means surrounding said hub flanges intermediate said convexly curved portion of said discs providing a spacer hub for said wheel.

In testimony whereof I hereunto affix my signature this 21st day of September, 1923.

MAYO E. ROE.